(12) United States Patent
Chang et al.

(10) Patent No.: US 9,305,276 B2
(45) Date of Patent: Apr. 5, 2016

(54) FOUNDRY PRODUCTION PLANNING

(71) Applicant: GLOBALFOUNDRIES INC., Grand Cayman (KY)

(72) Inventors: Chih-Hui Chang, South Burlington, VT (US); Rahul Nahar, South Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 550 days.

(21) Appl. No.: 13/734,357

(22) Filed: Jan. 4, 2013

(65) Prior Publication Data
US 2014/0195029 A1 Jul. 10, 2014

(51) Int. Cl.
G06Q 10/06 (2012.01)
G06Q 10/08 (2012.01)
G06Q 50/04 (2012.01)

(52) U.S. Cl.
CPC .............. *G06Q 10/06* (2013.01); *G06Q 10/087* (2013.01); *G06Q 50/04* (2013.01)

(58) Field of Classification Search
None
See application file for complete search history.

(56) References Cited

U.S. PATENT DOCUMENTS

| | | | |
|---|---|---|---|
| 5,630,070 | A | 5/1997 | Dietrich et al. |
| 5,943,484 | A | 8/1999 | Milne et al. |
| 6,041,267 | A | 3/2000 | Dangat et al. |
| 6,701,201 | B2 | 3/2004 | Hegde et al. |
| 6,871,110 | B1 | 3/2005 | Yen et al. |
| 7,058,587 | B1 * | 6/2006 | Horne .......................... 705/7.22 |
| 7,103,436 | B2 | 9/2006 | Denton et al. |
| 7,292,904 | B2 | 11/2007 | Denton et al. |
| 7,483,761 | B2 | 1/2009 | Wang et al. |
| 8,140,372 | B2 | 3/2012 | Chang et al. |
| 2007/0010904 | A1 | 1/2007 | Cheng et al. |

OTHER PUBLICATIONS

June-Young Bang et al., "Hierarchical Production Planning for Semiconductor Wafer Fabrication Based on Linear Programming and Discrete-Event Simulation", Jul. 7, 2009, IEEE Transactions on Automation Science and Engineering, vol. 7, Issue 2, p. 326-336.*
J. Asmundsson et al., "Tractable nonlinear production planning models for semiconductor wafer fabrication facilities", Feb. 2006, IEEE Transactions on Semiconductor Manufacturing, vol. 19, Issue 1, p. 95-111.*
Leachman et al, "IMPReSS: An Automated Production-Planning and Delivery-Quotation System at Harris Corporation—Semiconductor Sector", Interfaces, 26: 1, Jan.-Feb. 1996, (pp. 6-37).
Wang et al, "Blending Linear Programming and Heuristic Algorithms to Create Supply Chain Plans for IBM Global Semiconductor and Package Operations".

* cited by examiner

*Primary Examiner* — Mohammad Ali
*Assistant Examiner* — Saad M Kabir
(74) *Attorney, Agent, or Firm* — David Cain; Hoffman Warnick LLC

(57) ABSTRACT

Various embodiments include computer-implemented methods of modeling production for a semiconductor foundry. One method includes: obtaining a multi-part order including: a first order for a fixed number of preliminary products; and a second order for a fixed number of completed products formed from the fixed number of preliminary products; and determining an amount of inventory required to fulfill the first order and the second order, wherein the determining includes: creating a first model including a first inventory amount required to meet the first order; and creating a second model including a second inventory amount required to meet the second order, wherein the second model accounts for results from the first model, including the first inventory amount; and running a single linear programming (LP) process using the first model and the second model to determine the amount of inventory required to fulfill the first order.

9 Claims, 12 Drawing Sheets

An updated material balance constraint on wafer supply part number $$I_{jma} = I_{(j-1)ma} + \sum_k \sum_q F_{jrakq}$$

$$- \sum_{\substack{n \text{ st.} m \\ \text{is a component} \\ \text{of } n}} \sum_e QTYPER_{jmaen} P_{jnae}$$

Equation B

An updated material balance constraint on wafer demand part number

$$I_{jma} = I_{(j-1)ma} + RECEIPT_{jma} + \sum_{\substack{x.s.t \\ x+CT_{xmae}=j}} \sum_{e} YIELD_{xmae} * P_{xmae} + \sum_{n} L_{jmna} +$$

$$\sum_{\substack{xs.t \\ x+TT_{mav}=j}} \sum_{v} T_{xmva} - \sum_{n} SUBQTY_{jmna} * L_{jmna} - \sum_{v} T_{jmav} - \sum_{k} \sum_{q} F_{jmakq}$$

$$- \sum_{\substack{n \; st.m \\ \text{is a component} \\ of\; n}} \sum_{e} QTYPER_{jmaen} P_{jnae}$$

(Not part of Equation A.)

Equation A

 B

FIG. 10

An updated material balance constraint on wafer supply part number $$I_{jma} = I_{(j-1)ma} + \sum_k \sum_q F_{jrakq} - \sum_{\substack{n \ st.m \\ is\ a\ component \\ of\ n}} \sum_e QTYPER_{jmaen} P_{jnae}$$

Equation B

FOUNDRY PRODUCTION PLANNING

FIELD

The subject matter disclosed herein relates to production planning. More particularly, the subject matter relates to solutions for foundry production planning, e.g., in the formation of semiconductor devices.

BACKGROUND

In many cases, production of semiconductor modules (also referred to herein as "modules" or "integrated circuit (IC) modules") is performed in several processes. These processes may be performed by distinct entities at distinct locations. Initially, wafers are formed (e.g., silicon wafers) from bulk silicon; those wafers are then diced into chips (frequently in a group of substantially identical chips); those chips are then fitted with their appropriate connecting components and external circuitry to form a semiconductor device; and finally, those devices are packaged to form one or more modules which can be utilized for a particular purpose such as data storage, transmission, logic, transmission, etc.

In performing each of the above-noted processes of making a module, a percentage of the wafers, chips, devices and/or modules can be discarded due to a failure to meet particular specifications of a subsequent process. The percentage of the wafers, chips, devices, and ultimately modules that remains after production is considered the overall yield (percentage) of the process. Within that overall yield is a percentage yield in forming the wafers from the bulk silicon (wafer yield), a percentage yield in forming the chips from the wafers (chip yield), a percentage yield in forming the devices from the chips (device yield), and a percentage yield in forming the modules from the devices (module yield).

Prior methodologies involved a customer approaching a manufacturer (e.g., a foundry) to produce X number of modules based upon a particular design Y. The manufacturer would then take the bulk silicon, form wafers, chips, devices, and eventually, modules based upon the customer order. After each process, a percentage of the product is passed to the next process (yield), and a percentage is discarded because it does not meet specifications.

In some cases, customers have provided their own design for the module, and asked the manufacturer to produce the module based upon their design. Various manufacturers would produce the module and absorb the cost of the yield(s), which in some cases were attributable to the customer's design. However, absorbing the cost of the yield(s) can negatively affect the profitability of the manufacturing process A more recent approach has been to use a multi-part order without yield liability. In this case, the customer may approach the manufacturer to request Z number of wafers (from a bulk silicon), but the customer remains liable (financially responsible) for the yield. The manufacturer can test the wafers to determine yield, and the customer pays for any discarded product. In this model, the customer often then asks the manufacturer to produce chips, devices and modules from the wafer, but takes responsibility for at least one portion of the overall yield (e.g., the wafer yield).

While this recent approach has helped manufactures to reduce financial liability for yield, prior modeling approaches for predicting and accounting for yield in these processes are insufficient to address this scenario.

BRIEF DESCRIPTION

Various embodiments described include solutions for production planning in a foundry environment. This production planning can include a variety of planning processes, including: production start times and quantities, material choices/substitutions, and shipment planning, including quantity and/or timelines. The production planning may account for manufacturing and distribution locations, customer locations, as well as vendor/supplier locations, all relative to one or more of each other.

In some cases, a computer-implemented method of modeling production for a semiconductor foundry is disclosed. In one case, the method includes: obtaining a multi-part order including: a first order for a fixed number of preliminary products; and a second order for a fixed number of completed products formed from the fixed number of preliminary products; and determining an (optimal) production plan (amount of inventory and manufacturing schedule) required to fulfill the first order and the second order, wherein the determining includes: creating a first model including a first inventory amount required to meet the first order; creating a second model including a second inventory amount required to meet the second order, wherein the second model accounts for results from the first model, including the first inventory amount; and running a single linear programming (LP) process using the first model and the second model to determine the production plan required to fulfill the first order.

A first aspect of the invention includes a computer-implemented method of modeling production for a semiconductor foundry. The method can include: obtaining a multi-part order including: a first order for a fixed number of preliminary products; and a second order for a fixed number of completed products formed from the fixed number of preliminary products; and determining an (optimal) production plan (amount of inventory and manufacturing schedule) required to fulfill the first order and the second order, wherein the determining includes: creating a first model including a first inventory amount required to meet the first order; creating a second model including a second inventory amount required to meet the second order, wherein the second model accounts for results from the first model, including the first inventory amount; and running a single linear programming (LP) process using the first model and the second model to determine the production plan required to fulfill the first order.

A second aspect of the invention includes a system having: at least one computing device configured to model production for a semiconductor foundry by performing actions including: obtaining a multi-part order including: a first order for a fixed number of preliminary products; and a second order for a fixed number of completed products formed from the fixed number of preliminary products; and determining an (optimal) production plan (amount of inventory and manufacturing schedule) required to fulfill the first order and the second order, wherein the determining includes: creating a first model including a first inventory amount required to meet the first order; creating a second model including a second inventory amount required to meet the second order, wherein the second model accounts for results from the first model, including the first inventory amount; and running a single linear programming (LP) process using the first model and the second model to determine the production plan required to fulfill the first order.

A third aspect of the invention includes a computer program product having program code stored on a computer readable storage medium, which when executed by at least one computing device, causes the at least one computing device to perform a method of modeling production for a semiconductor foundry, the method including: obtaining a multi-part order including: a first order for a fixed number of preliminary products; and a second order for a fixed number of completed products formed from the fixed number of preliminary products; and determining an (optimal) production plan (amount of inventory and manufacturing schedule) required to fulfill the first order and the second order, wherein the determining includes: creating a first model including a first inventory amount required to meet the first order; creating a second model including a second inventory amount required to meet the second order, wherein the second model accounts for results from the first model, including the first inventory amount; and running a single linear programming (LP) process using the first model and the second model to determine the production plan required to fulfill the first order.

Various other aspects of the invention include computer program products, computer systems and computer-implemented methods of modeling production for a semiconductor foundry. The processes can include: obtaining a multi-part order (bill of materials) including: a) a first order for a fixed number of preliminary products; and b) a second order for a fixed number of completed products formed from the fixed number of preliminary products; based upon the part numbers required to fill the first order and the second order, dividing the bill of materials for foundry parts to fulfill the first order and the second order, including dividing the bill of materials into foundry wafer demand part numbers and corresponding assembly part numbers; create a supplemental component part number representing foundry wafer demand; consigning the supply for the foundry wafer demand part number back to the newly created supplemental part number; generating a new material balance constraint in the foundry production solver for the newly created supplemental part number; running a single linear programming (LP) model to solve the production plans for both foundry wafer demand and foundry module demand simultaneously; and generating a desired (e.g., optimal) production plan report for the foundry wafer and module demand.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 10 shows an updated material balance constraint on wafer demand part number (B) as compared with the prior art, updated according to embodiments.

FIG. 11 shows a material balance constraint on supplemental wafer supply (part number O) according to embodiments.

Figure 1:
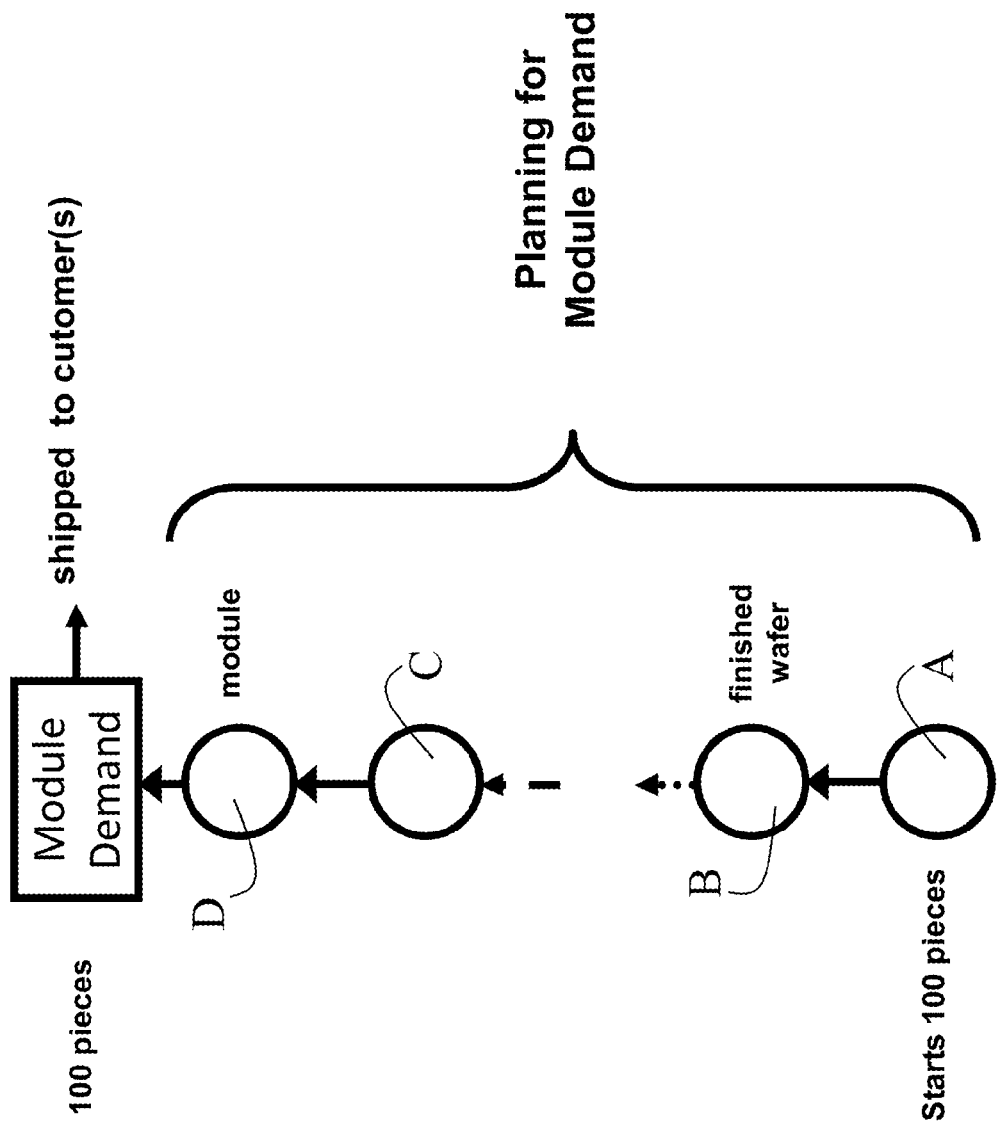
FIGS. 1-3 show illustrative process flow diagrams that illustrate a problem associated with modeling production in a multi-part order format.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As noted, the subject matter disclosed herein relates to production planning. More particularly, the subject matter relates to solutions for foundry production planning, e.g., in the formation of semiconductor devices.

As described herein, various embodiments described include solutions for production planning in a foundry environment. It is understood that the term "production planning" can include a variety of planning processes, including: production start times and quantities, material choices/substitutions, and shipment planning, including quantity and/or timelines. The production planning may account for manufacturing and distribution locations, customer locations, as well as vendor/supplier locations, all relative to one or more of each other.

Various aspects of the invention include computer program products, computer systems and computer-implemented methods of modeling production for a semiconductor foundry. The processes can include: obtaining a multi-part order (bill of materials) including: a) a first order for a fixed number of preliminary products; and b) a second order for a fixed number of completed products formed from the fixed number of preliminary products; based upon the part numbers required to fill the first order and the second order, dividing the bill of materials for foundry parts to fulfill the first order and the second order, including dividing the bill of materials into foundry wafer demand part numbers and corresponding assembly part numbers; create a supplemental component part number representing foundry wafer demand; consigning the supply for the foundry wafer demand part number back to the newly created supplemental part number; generating a new material balance constraint in the foundry production solver for the newly created supplemental part number; running a single linear programming (LP) model to solve the production plans for both foundry wafer demand and foundry module demand simultaneously; and generating a desired (e.g., optimal) production plan report for the foundry wafer and module demand.

Various alternative embodiments include computer-implemented methods, computer systems and computer program products for modeling production for a semiconductor foundry. In one case, the method includes: obtaining a multi-part order including: a first order for a fixed number of preliminary products; and a second order for a fixed number of completed products formed from the fixed number of preliminary products; and determining a production plan (e.g., an optimal production plan, including an amount of inventory and a manufacturing schedule) required to fulfill the first order and the second order, wherein the determining includes: creating a first model including a first inventory amount required to meet the first order; creating a second model including a second inventory amount required to meet the second order, wherein the second model accounts for results from the first model, including the first inventory amount; and running a single linear programming (LP) process using the first model and the second model to determine the production plan required to fulfill the first order.

One problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (e.g., typically on the order of thousands in semiconductor manufacturing). Such advance planning depends upon the availability of finite resources which include: finished goods inventory, work in process (WIP) inventory at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming or other advanced planning and scheduling methods.

Illustrative Example of Conventional Production Planning Failures:

A conventional production planning linear program (LP) is shown below. The production planning LP is also generally illustrated in U.S. Pat. No. 5,971,585, which is hereby incorporated by reference in its entirety.

The LP illustrated in this section makes decisions including: production starts, material substitutions, and shipments planned to customers, between manufacturing and distribution locations, and from vendor suppliers. An LP is composed of an objective function that defines a measure of the quality of a given solution, and a set of linear constraints. The types of equations used in production planning models are well known to those practiced in the art and include:

(1) Material Balance Constraints, which ensure conservation of material flow through the network of stocking points comprising the supply chain.

(2) Capacity Constraints, which ensure that the capacity available for manufacturing activities is not exceeded.

(3) Backorder Conservation Constraints, which balance the quantity of a given part backordered in a given planning period with the quantity backordered in the previous planning period and the net of new demand and new shipments.

(4) Sourcing Constraints, which define target ranges (minimum and maximum) of shipments that should be made from a particular manufacturing or vendor location in the supply chain.

A conventional LP formulation is provided below, i.e., definition of subscripts, definition of objective function coefficients, definition of constants, definition of decision variables, LP formulation or equations.

Definition of Subscripts:

j: time period;

m: material (part number);

a: plant location within the enterprise;

n: material being substituted (part number);

z: group (which represents a family or collection of part numbers);

e: process (a method of purchasing or manufacturing a material at a plant);

v: receiving plant location;

k: demand center (i.e., customer location) (Note: the set of customer locations is mutually exclusive from the set of plant locations);

q: demand class which indicates relative priority;

w: resource capacity which could be a machine, labor hour, or other constraint; and u: represents a customer (or, consumer) location which refers to an internal plant, external demand center, or to a generic indicator meaning any plant/or demand center.

Definition of Objective Function Coefficients:

$PRC_{jmae}$: cost of releasing one piece of part m during period j at plant a using process e;

$SUBC_{jnma}$: substitution cost per piece of material being substituted (e.g., a part) n which is being substituted by part number m during period j at plant a;

$TC_{jmav}$: transportation cost per piece of part number m leaving plant a during period j which are destined for plant v;

$INVC_{jma}$: inventory cost of holding one piece of part number m at the end of period j at a particular plant a;

$DMAXC_{jzau}$: cost per piece of exceeding the maximum amount of shipments of group z parts from plant a to customer location(s) u during period j;

$DMINC_{jzau}$: cost per piece of falling short of the minimum amount of shipments specified for group z parts from plant a to consumer location(s) u during period j;

$BOC_{jmkq}$: backorder cost of one piece of part m at the end of period j for class q demand at customer location k;

Definition of Constants:

$DEMAND_{jmkq}$: demand requested during time period j for part number m at customer location k for demand class q;

$RECEIPT_{jma}$: quantity of projected wip and purchase order receipts for part number m expected to be received at plant a during time period j;

$CAPACITY_{jaw}$: capacity of resource w available at plant a during period j to support production starts;

$CAPREQ_{jmaew}$: capacity of resource w required for part number m at plant a for process e during period j;

$QTYPER_{jmaen}$: quantity of part number m needed per part number n (material being substituted) during period j at plant a using process e;

$YIELD_{jmae}$: output of part number m per piece released or started at plant a during time period j using process e;

$SUBQTY_{jmna}$: quantity of part number m required to substitute for one piece of part number n at plant a during time period j;

$MAXPCT_{jzau}$: maximum percentage of total shipments of group z (collection of parts) leaving plant (supplier) a during period j to support consumption at consuming location(s) u;

$MINPCT_{jzau}$: minimum percentage of total shipments of group z (collection of parts) leaving plant (supplier) a during period j to support consumption at consuming location(s) u;

$CT_{jmae}$: cycle time. The number of periods between the release and completion of part number m jobs for releases made using process e at plant a during time period j; and $TT_{mav}$: transport time for part number m from plant a to plant v.

Definition of LP Decision Variables:

$I_{jma}$: inventory at the end of period j for part number m at a particular plant a;

$P_{jmae}$: production starts of part number m during period j at plant a using process e;

$L_{jmna}$: quantity of part number n which is being substituted by part number m during period j at plant a;

$T_{jmav}$: internal shipments of part number m leaving plant a during period j which are destined for plant v;

$F_{jmakq}$: shipments of part number m leaving plant a during period j and satisfying class q demand at external customer k;

$B_{jmkq}$: back orders of part m at the end of period j for class q demand at customer location k;

$H_{jzu}$: total shipments of group z (z is a "collection" of parts) leaving suppliers during period j to support consumption at consuming location(s) u;

$S_{jzau}$: amount by which total shipments of parts in z from plant a to consuming location(s) u during period j exceeds the maximum amount specified as desired in the sourcing rules; and $G_{jzau}$: amount by which total shipments of group z parts from plant a to consuming location(s) u during period j falls short of the minimum amount specified as desired in the sourcing rules.

Illustrative Formulation According to Various Embodiments of the Invention

LP Equations or Formulation:

The following minimizes the objective function subject to the constraints shown below.

Objective Function:
Minimize:

$$\sum_j \sum_m \sum_a \sum_e PRC_{jmae} P_{jmae} +$$

$$\sum_j \sum_m \sum_n \sum_a SUBC_{jmna} L_{jmna} + \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + + \sum_j \sum_m \sum_k \sum_q BOC_{jmkq} B_{jmkq}$$

Subject to:

a) Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) + G_{jzau} \geq MINPCT_{jzau} H_{jzu}$$

b) Capacity Constraints:

$$\sum_m \sum_e CAPREQ_{jmaew} P_{jmae} \leq CAPACITY_{jaw}$$

c) Backorder Constraints:

$$B_{jmkq} = B_{(j-1)mkq} + DEMAND_{jmkq} - \sum_a F_{jmakq}$$

d) Material Balance Constraints:

$$I_{jma} = I_{(j-1)ma} + RECEIPT_{jma} + \sum_{\substack{x...s..t \\ x+CT_{xmae}=j}} \sum_e YIELD_{xmae} * P_{xmae} +$$

-continued $$\sum_n L_{jmna} + \sum_{\substack{x.s.t \\ x+TT_{mav}^t=j}} \sum_v T_{xmva} - \sum_n SUBQTY_{jmna} * L_{jmna} -$$

$$\sum_v T_{jmav} - \sum_k \sum_q F_{jmakq} - \sum_{\substack{n.st.m \\ \text{is a component} \\ \text{of } n}} \sum_e QTYPER_{jmaen} P_{jnae}$$

e) Non-Negativity Constraints:

All $X_{i,j...} \geq 0$, where X is a generic decision variable and i, j, etc. represent generic subscripts.

As described herein, in performing the processes of making a semiconductor (or, integrated circuit (IC)) module, a percentage of the wafers, chips, devices and/or modules can be discarded due to a failure to meet particular specifications of the subsequent process. The percentage of the wafers, chips, devices, and ultimately modules that remains after production is considered the overall yield (percentage) of the process. Within that overall yield is a percentage yield in forming the wafers from the bulk silicon (wafer yield), a percentage yield in forming the chips from the wafers (chip yield), a percentage yield in forming the devices from the chips (device yield), and a percentage yield in forming the modules from the devices (module yield).

Prior methodologies involved a customer approaching a manufacturer (e.g., a foundry) to produce X number of modules based upon a particular design Y. The manufacturer would then take the bulk silicon, form wafers, chips, devices, and eventually, modules based upon the customer order. After each process, a percentage of the product is passed to the next process (yield), and a percentage is discarded because it does not meet specifications.

In some cases, customers have provided their own design for the module, and asked the manufacturer to produce the module based upon their design. Various manufacturers would produce the module and absorb the cost of the yield(s), which in some cases were attributable to the customer's design. However, absorbing the cost of the yield(s) can negatively affect the profitability of the manufacturing process A more recent approach has been to use a multi-part order without yield liability. In this case, the customer may approach the manufacturer to request Z number of wafers (from a bulk silicon), but the customer remains liable (financially responsible) for the yield. The manufacturer can test the wafers to determine yield, and the customer pays for any discarded product. In this model, the customer often then asks the manufacturer to produce chips, devices and modules from the wafer, but takes responsibility for at least one portion of the overall yield (e.g., the wafer yield).

While this recent approach has helped manufactures to reduce financial liability for yield, prior modeling approaches for predicting and accounting for yield in these processes are insufficient to address this scenario.

Figure 2:
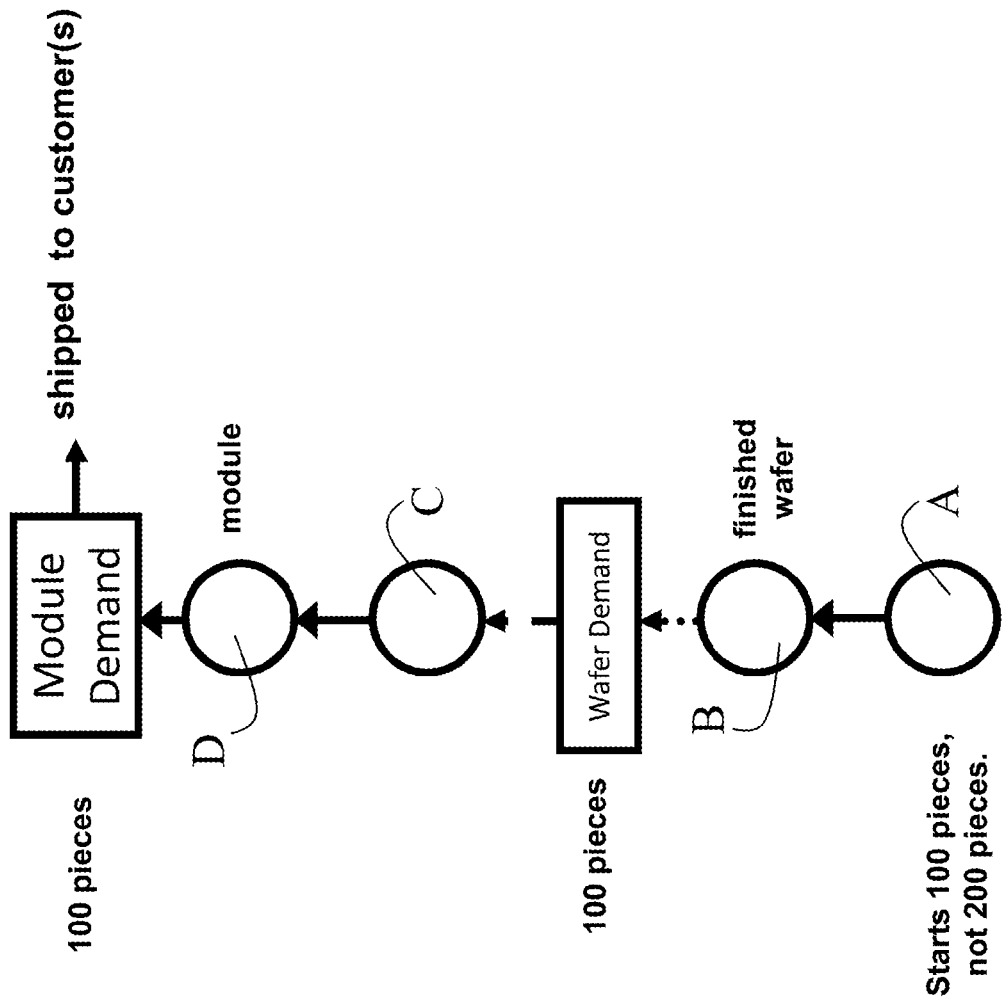
Figure 3:
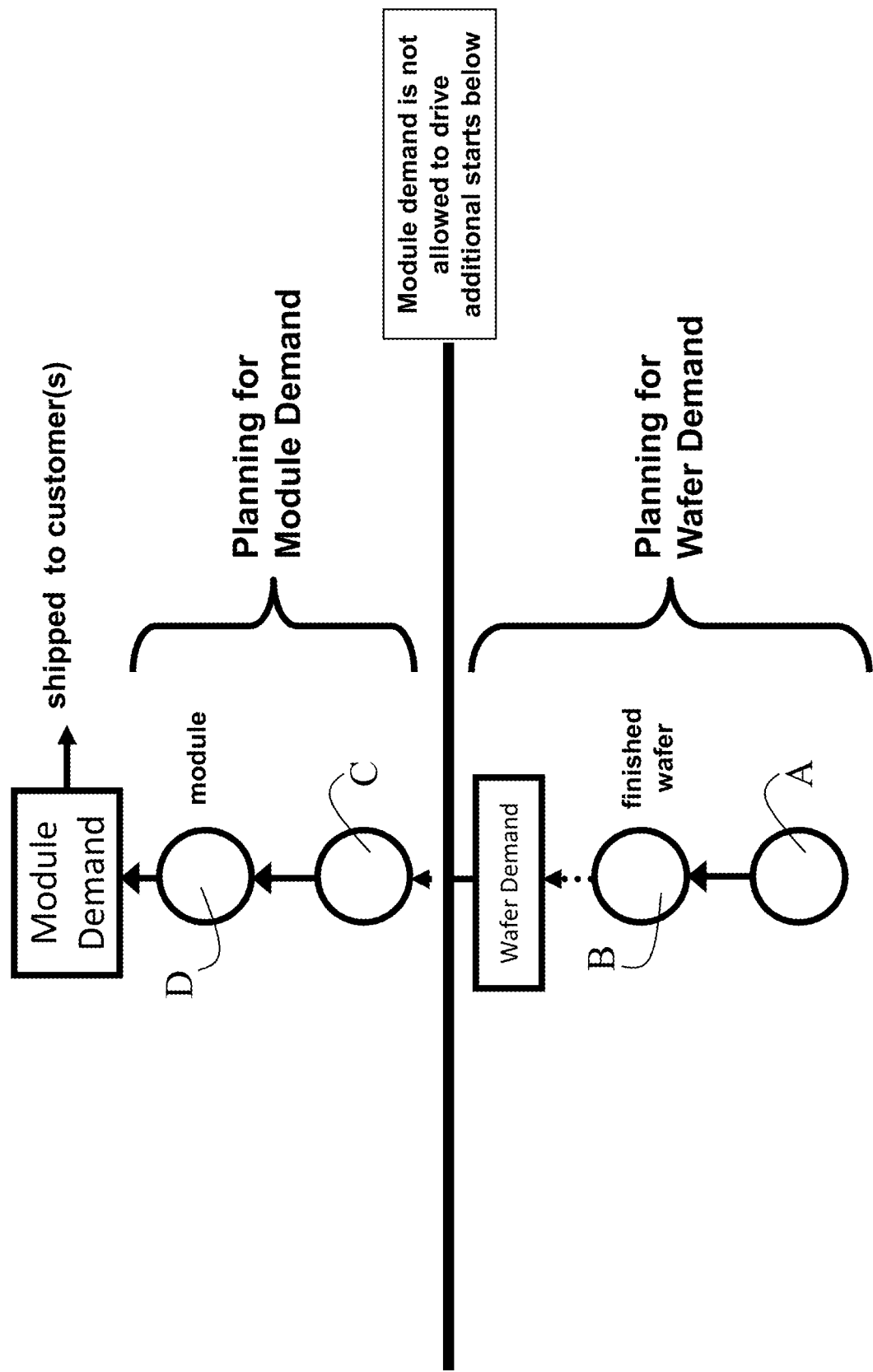

FIGS. 1-3 show illustrative process flow diagrams which more clearly illustrate the problem associated with modeling production in this multi-part order format. As shown in FIG. 1, parts A, B, C and D illustrate wafer planning processes in the process of meeting singular-part module demand. Considering a one-to-one mapping at each part, the conventional method can drive 100 pieces (parts) of wafer starts at part A in order to meet the 100 pieces of module demand at part D. In other words, at node A, the starting point targets an ending point at node D of 100 modules (Module demand). Planning for nodes B and C is part of meeting the module demand at node D. FIG. 2 shows the conventional foundry-plus linear model, illustrating a multi-part order parameters, where a wafer demand is introduced between nodes B and C. The wafer demand is distinct from the module demand, because the order involves two distinct (but related sub-orders). The conventional approach for modeling the problems outlined in FIGS. 1-2 considers wafer demand and module demands as separate orders, and drives 200 pieces of wafer starts at part A in order to meet these separate orders. However, in the foundry-plus service model described herein, only 100 pieces of wafer starts should be driven at part A based upon wafer demand. In this foundry-plus model, the supply available at part B should then be used as a demand component to meet the module demand at node D.

FIG. 3 illustrates the problem of a multi-part order more clearly, where module demand (node D) is not allowed to drive additional wafer production (node B) above and beyond the wafer demand, because wafer production is its own distinct customer order.

A more recent conventional approach has involved using a multi-part order without yield liability. In this case, the customer may approach the manufacturer to request Z number of wafers (formed from a bulk silicon), but the customer remains liable (e.g., financially responsible) for the yield from that bulk silicon. The manufacturer can test the wafers to determine yield, and the customer pays for any discarded product. In this conventional model, the customer may ask the manufacturer to produce chips, devices and modules from the wafer, but takes responsibility for at least one portion of the overall yield (e.g., the wafer yield).

While this recent approach has helped manufacturers to reduce their financial liability for yield, prior modeling approaches for predicting and accounting for yield in these new processes are ineffective at addressing the associated problems. For example, the unsuccessful prior approach includes creating two distinct liner programming (LP) problems, which are solved successively. That is, this approach involves establishing the following linear programming problems based upon a customer order:

LP1: solve the wafer demand, e.g., based upon the design of the wafer requested, determining an amount of bulk silicon required to yield the desired amount of specified wafer; and LP2: Based upon the available supply for the determined wafer demand, solve the module demand, e.g., determining the production plan from wafer to module (including intermediate processes and associated yields) to meet the module demand.

Solving two linear programming (LP) problems as noted above using the conventional approach would double the already long run time (processing time) involved.

Figure 4:
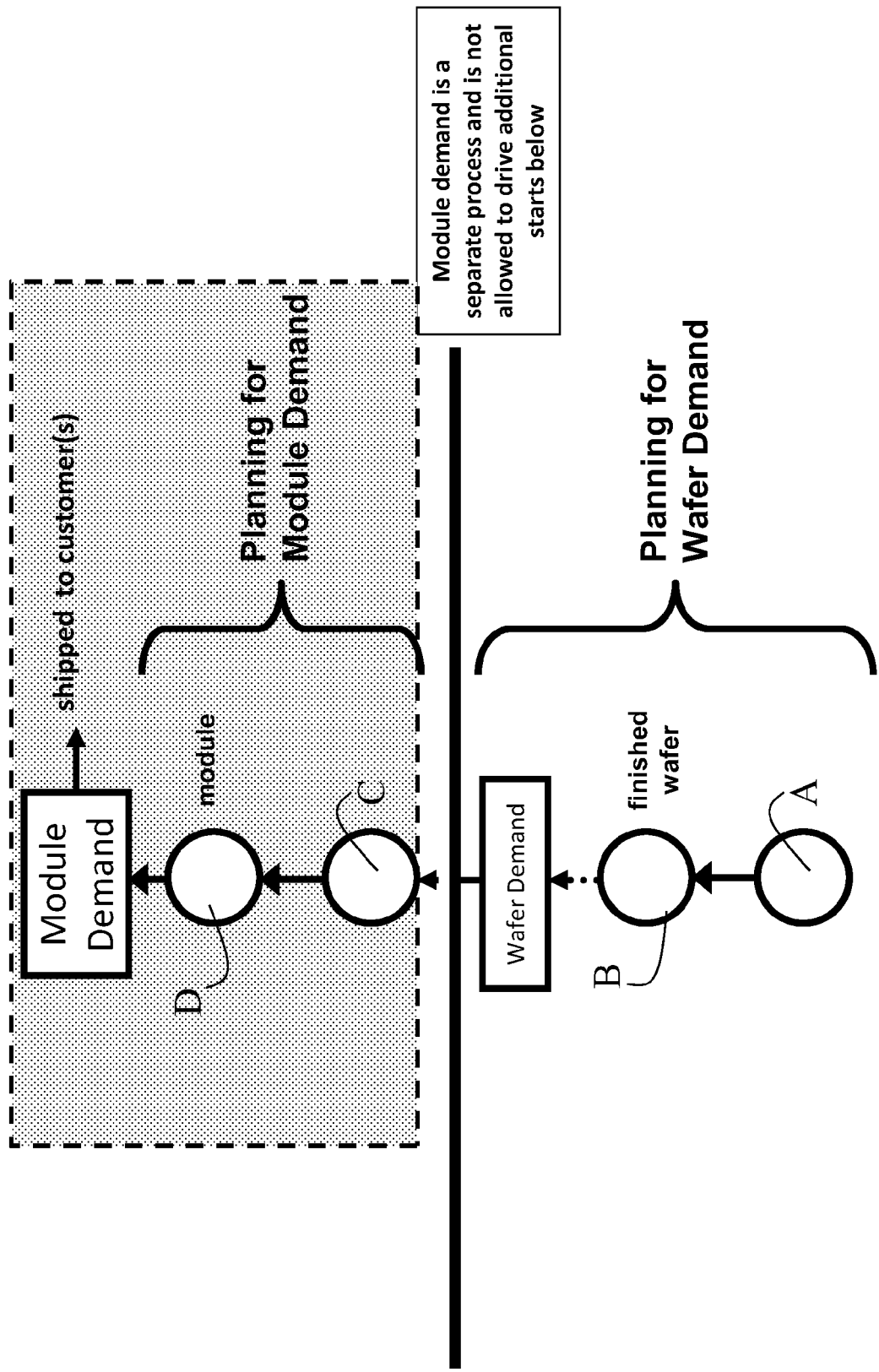
FIGS. 4-5 illustrate a prior art approach in view of the process flow diagrams of FIGS. 1-3.
Figure 5:
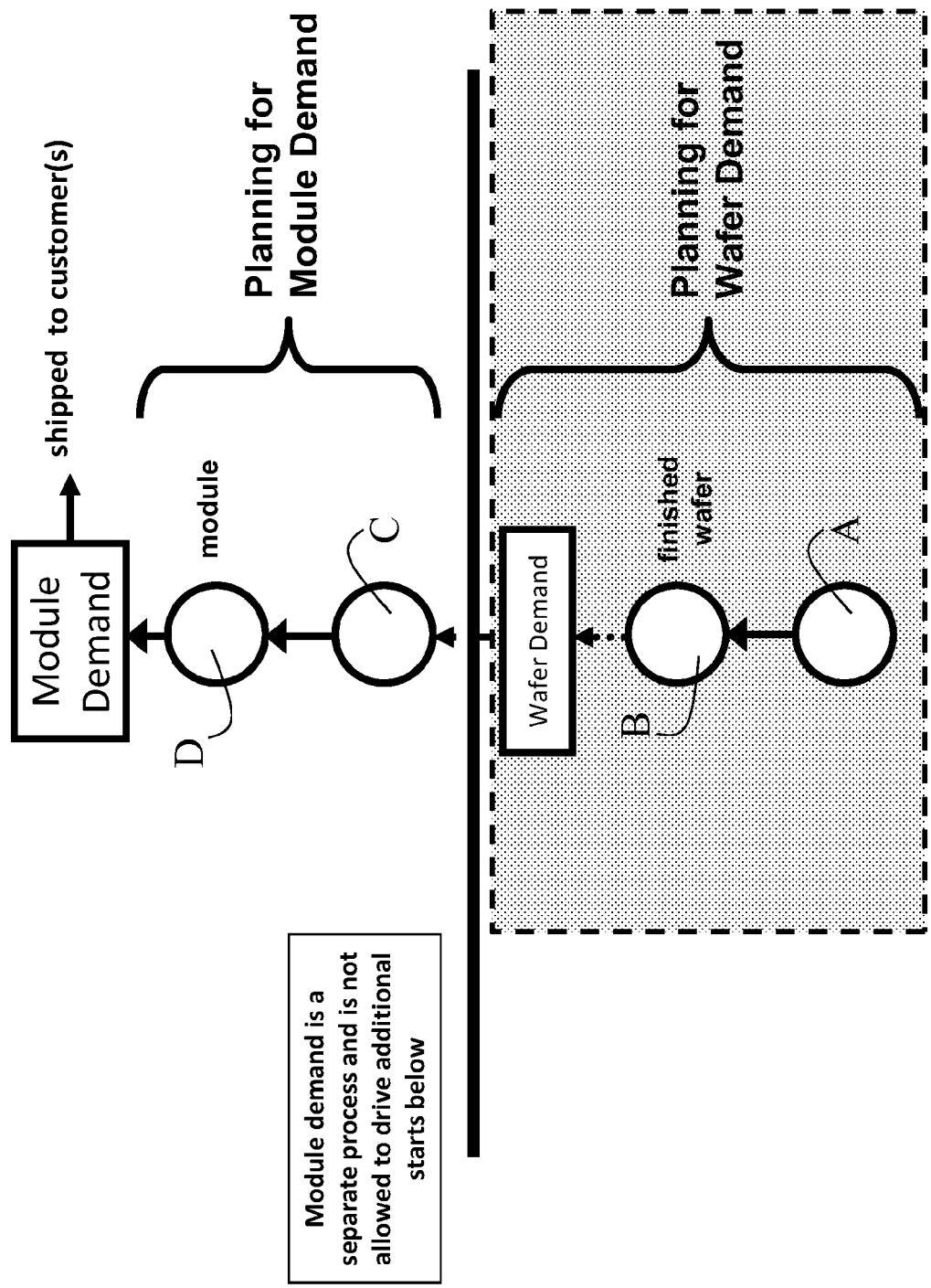

FIGS. 4-5 illustrate the prior art approach in view of the process flow diagram of FIG. 3. FIGS. 4-5 illustrate partitioning of the process into two distinct linear programming (LP) problems: 1) wafer demand; and 2) module demand. As noted, module demand is not permitted to drive additional wafer production in this prior art model. FIGS. 4-5 show the prior art solution of solving the wafer demand LP, and then subsequently solving the module demand LP (where the obstructed LP is solved in a separate linear programming process). This prior art approach avoids the unintended consequence of having the module demand drive additional wafer production beyond the original wafer demand.

Figure 6:
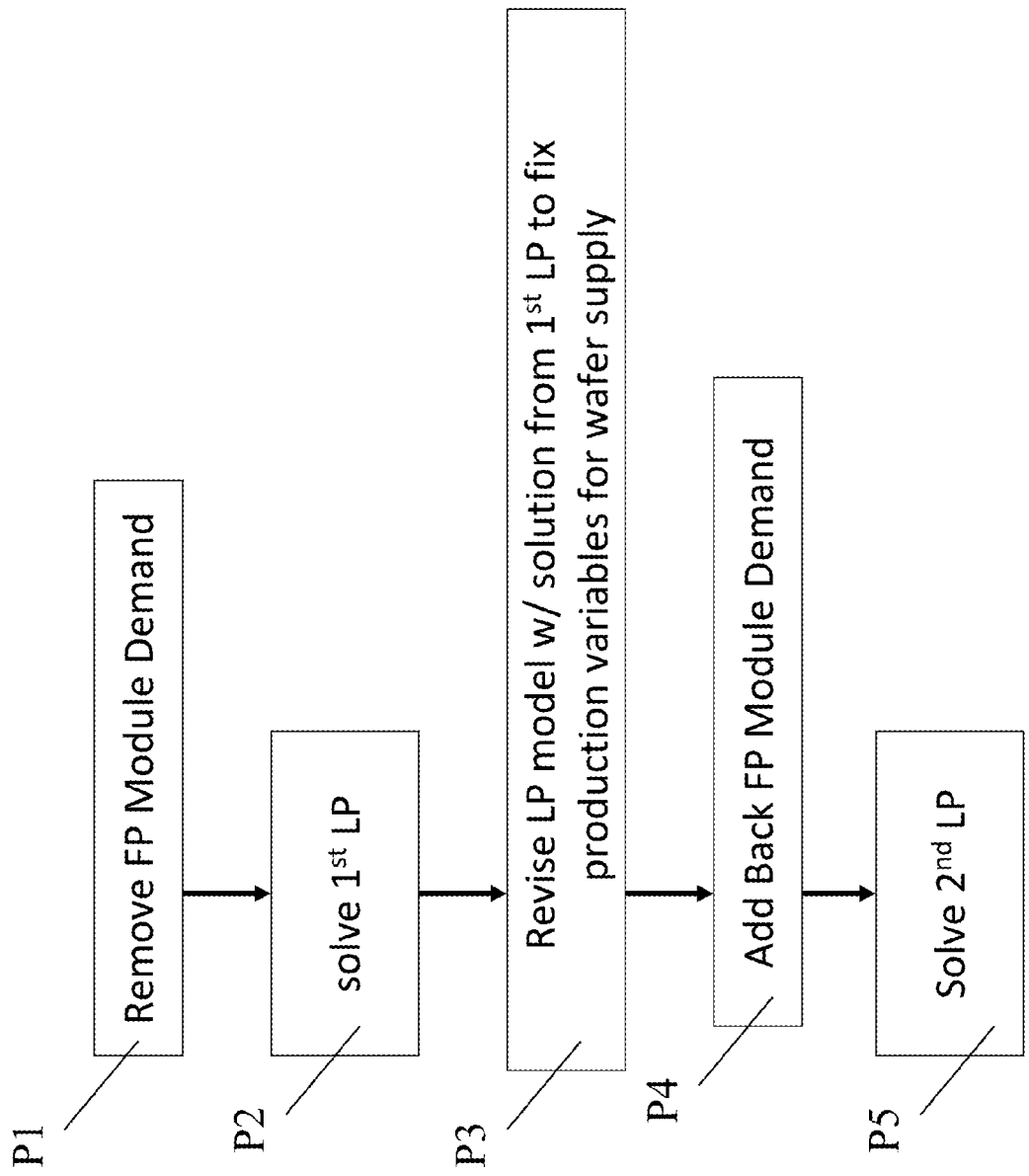
FIG. 6 shows a method flow diagram illustrating the processes of the prior art.

FIG. 6 shows a method flow diagram illustrating the processes of the prior art. As shown, the process can include solving two distinct LP problems (wafer demand and module demand). In particular, the prior art approach involves:

P1: Obtaining customer order and removing module demand (leaving wafer demand);

P2: Solving the first LP problem (wafer demand);

P3: Creating a second LP approach based upon the solution to the first LP problem. This involves revising the first LP model using the solution from the first LP problem, to fix production variables which are tied to wafer supply;

P4: Add the module demand back to the solution for the first LP; and

P5: Solve the second LP problem (module demand).

Figure 7:
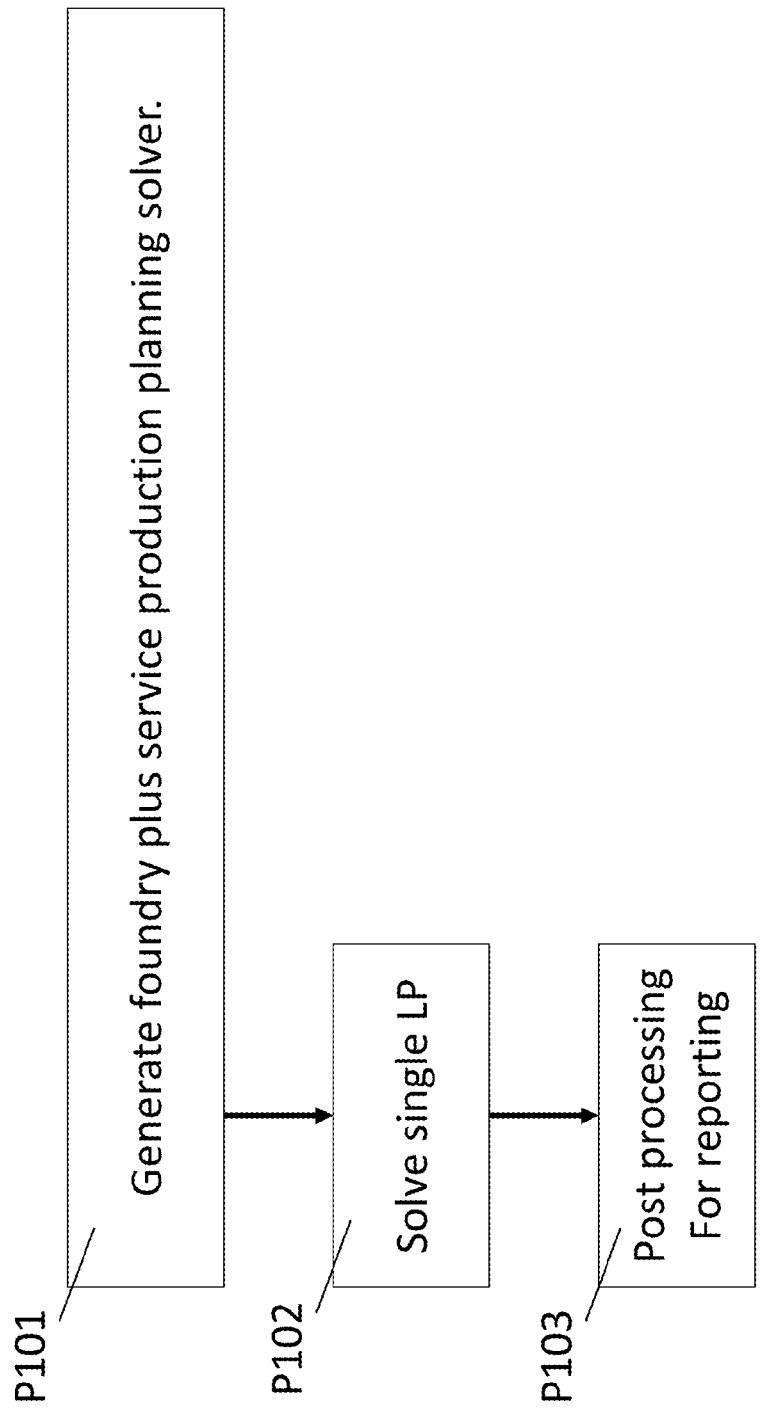
FIG. 7 shows an illustrative flow chart depicting a general method according to various embodiments.

FIG. 7 shows a flow diagram depicting a general version of a method according to various embodiments. As shown the method can include processes P101-P103.

Figure 12:
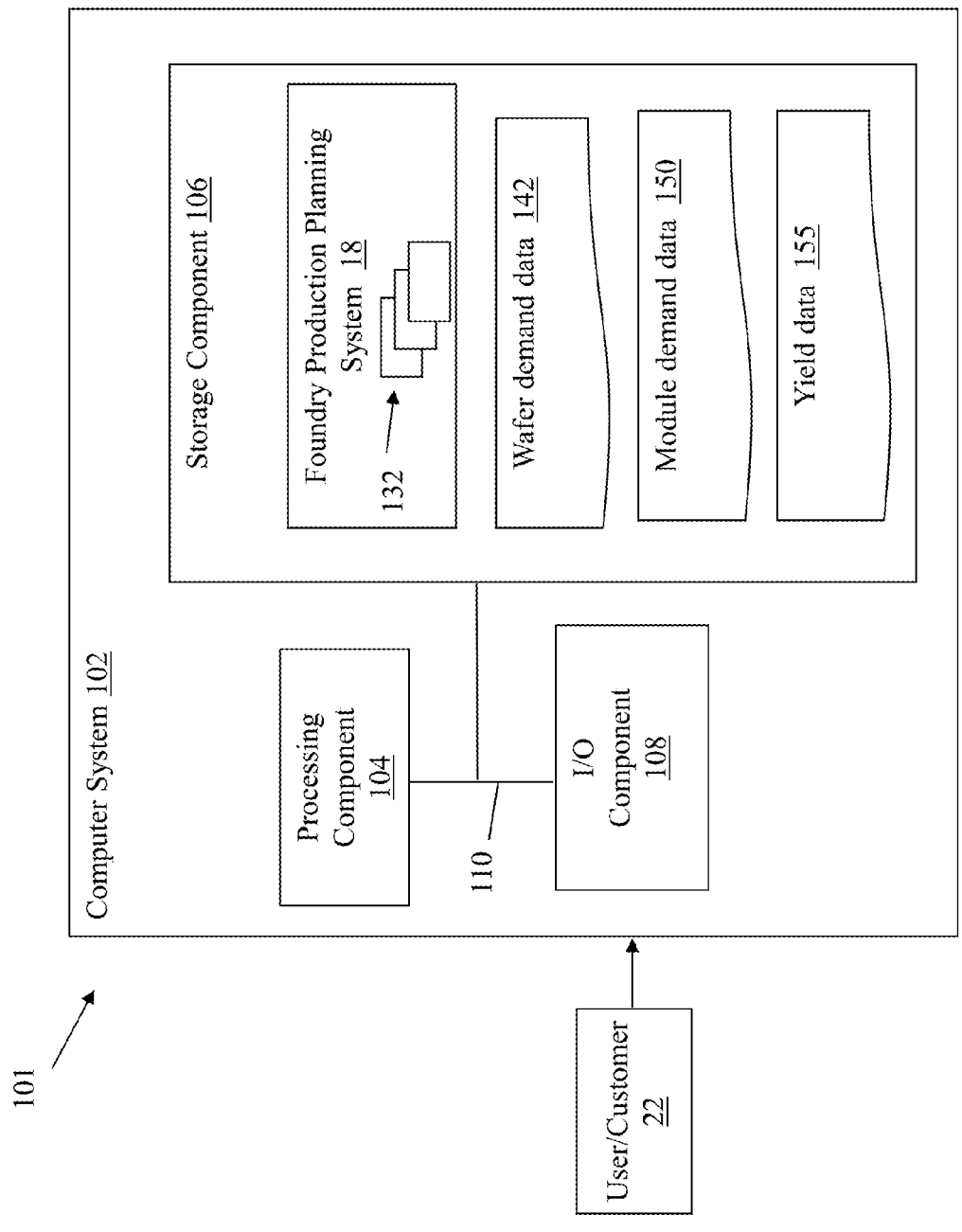
FIG. 12 shows an illustrative environment including a computer system and a foundry production planning system, depicted according to various embodiments.

Process P101 includes generating a foundry-plus-service production planning solver (also referred to as a foundry production planning system 18, FIG. 12) to fulfill a multi-part order. The foundry-plus-service production planning solver (foundry production planning system, or simply, solver) can include planning data such as bill of material data, yield data, cycle time data, etc. The solver can also include data representing a multi-part order, e.g., for foundry wafer demand and for foundry module demand.

Process P102 represents executing the solver (foundry planning production system 18) on a computer system (e.g., computer system 102, FIG. 12) in order to solve one or more linear programming problems, e.g., including a multi-part order. as the second step of FIG. 7. As described herein, process P103 can include post-processing and reporting of the solution obtained in process P102. When compared with the conventional approach, processes P101-P103 are more streamlined and efficient, as only a single solver is generated and executed according to the various embodiments of the invention, as opposed to the multiple linear programming solvers needed for solving multi-part foundry order in conventional approaches.

Figure 8:
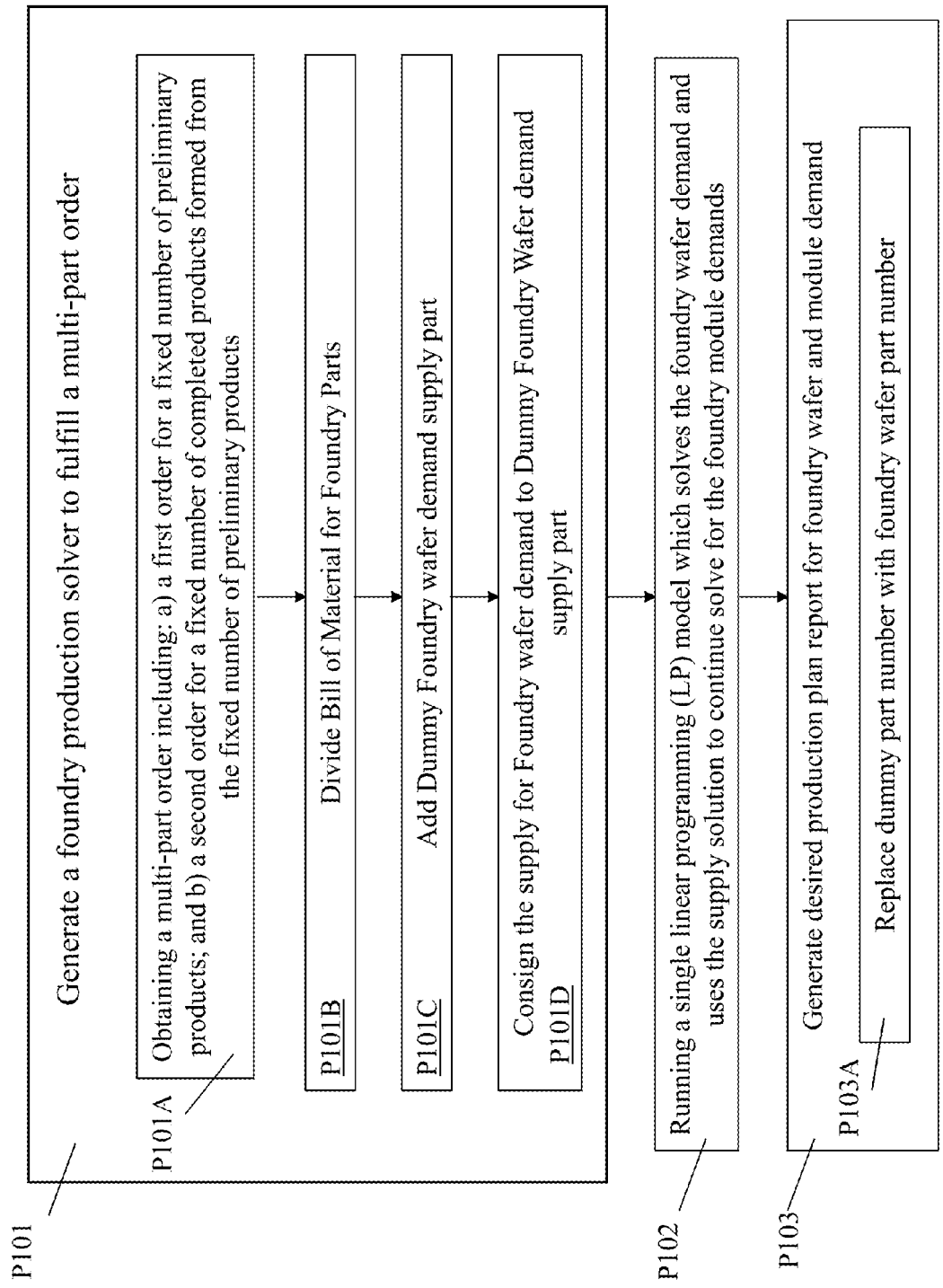
FIG. 8 shows an illustrative process flow diagram depicting a method according to various embodiments of the invention.

Turning to FIG. 8, a more detailed flow diagram is shown illustrating sub-processes from the general flow diagram of FIG. 7. As shown, processes P101-P103 are shown, but including further detail about the processes involved in each of those general processes.

Process P101 includes sub-processes P101A-P101D:

Process P101A: Obtaining a multi-part order including: a) a first order for a fixed number of preliminary products; and b) a second order for a fixed number of completed products formed from the fixed number of preliminary products;

Process P101B: Based upon the part numbers required to fill the first order and the second order, this process includes dividing the bill of materials for foundry parts to fulfill the orders, which can include dividing the bill of materials into foundry wafer demand part numbers and corresponding assembly part numbers. Using the example from FIG. 2, P101B includes dividing the bill of material for foundry wafer demand part number B and it assembly part number C. This is illustrated in the updated process flow diagram of FIG. 9. Subsequent to dividing the bill of material, the foundry production planning system 18 can update the corresponding material balance constraint for foundry wafer demand part number B according to the following equation (Equation A, shown in FIG. 10):

$$I_{jma} = I_{(j-1)ma} + RECEIPT_{jma} + \sum_{\substack{x,s,t \\ x+CT_{xmae}=j}} \sum_{e} YIELD_{xmae} * P_{xmae} + \sum_{n} L_{jmna} + \sum_{\substack{x,s,t \\ x+TT_{mav}=j}} \sum_{v} T_{xmva} - \sum_{n} SUBQTY_{jmna} * L_{jmna} - \sum_{v} T_{jmav} - \sum_{k} \sum_{q} F_{jmakq}$$

When compared with the original constraint in demand B, as shown in FIG. 10, it is evident that assembly part number C can no longer drive the production from foundry wafer demand part number downward.

Process P101C: returning to FIG. 9, in order to address the disconnect between demand B and part number(s) C, the foundry production planning system 18 can create a supplemental (dummy) component part number O for foundry wafer demand assembly part number C. Part number O can have the same component parameter as part number B to part number C. As a result, the material balance constraint for part number C can reflect that the newly created part number O will be the supplying component for part number C.

Figure 9:
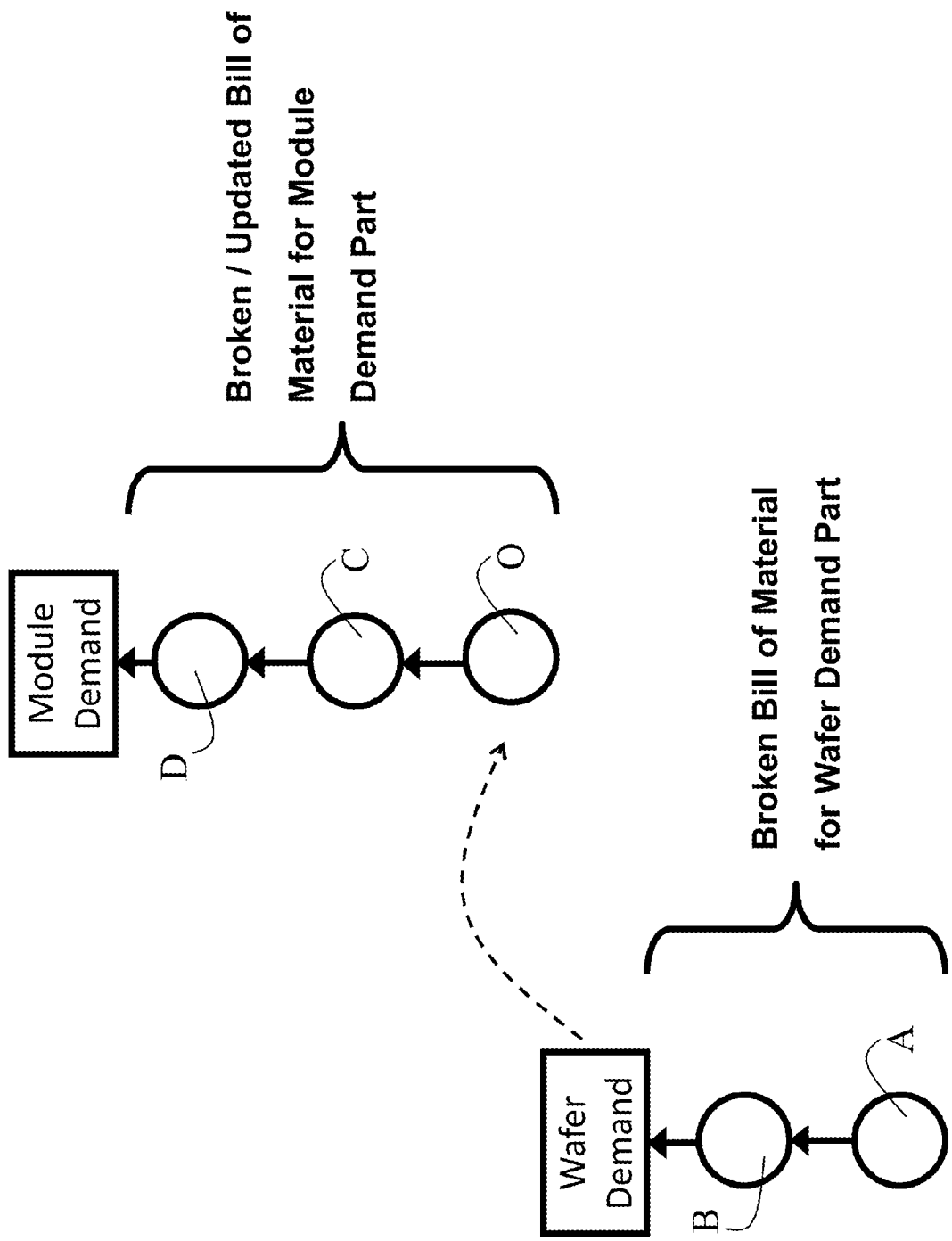
FIG. 9 shows an updated process flow diagram from FIG. 3, which is updated according to the processes depicted in FIG. 7.

Process P101D: the foundry production planning system 18 can consign the supply for foundry wafer demand part number B back to the newly created supplemental part number O. At this point, the example process flow diagram shown in FIG. 3 is modified into the multi-part flow as illustrated in FIG. 9.

After P101D, a new material balance constraint in the foundry production solver for part number O is demonstrated as follows (Equation B, shown in FIG. 11):

$$I_{jma} = I_{(j-1)ma} + \sum_k \sum_q F_{jrakq} - \sum_{\substack{n\ st.m \\ is\ a\ component \\ of\ n}} \sum_e QTYPER_{jmaen} P_{jnae}$$

In this equation, a new material subscript (r) is introduced when compared with Equation A. The incorporation of shipping variable (F) for material (r) in the material balance constraint of material (m) enables the supply for foundry wafer demand, e.g., part number (B), being consigned back as supply for the supplemental foundry part number (O).

Following process P101, including sub-processes P102A-P102D, in process P102, the foundry production planning system 18 can run a single linear programming (LP) model to solve the production plans for both foundry wafer demand and foundry module demand simultaneously (in a single linear programming system).

Following process P102, process P103 can include generating a desired (e.g., optimal) production plan report for the foundry wafer and module demand. This can include, in sub-process P103A, replacing dummy part number(s) with foundry wafer part number(s), e.g., replacing the occurrences of supplemental part number (O) back to foundry wafer demand part number (B), in order to correctly reflect the pegging information from foundry wafer demand part number (B) to its assembly part number (C).

Alternative particular embodiments of the invention include a method (e.g., a computer-implemented method) of production planning for a semiconductor foundry. In some cases, the method can include:

Process P301: obtaining a multi-part order including: a) a first order for a fixed number of preliminary products; and b) a second order for a fixed number of completed products formed from the fixed number of preliminary products;

Process P302: determining an amount of inventory required to fulfill the first order and the second order, wherein the determining includes:

Process P302A: creating a first model including a first inventory amount required to meet the first order;

Process P302B: creating a second model including a second inventory amount required to meet the second order, wherein the second model accounts for results from the first model, including the first inventory amount; and Process P302C: running a single linear programming (LP) process using the first model and the second model to determine the amount of inventory required to fulfill the first order; and Process P303: providing a report indicating the amount of material required to complete the first order and the second order.

FIG. 12 depicts an illustrative environment 101 for production planning in a foundry according to embodiments. To this extent, the environment 101 includes a computer system 102 that can perform a process described herein in order to prioritize via implementation in forming integrated circuits. In particular, the computer system 102 is shown as including an foundry production planning system 18, which makes computer system 102 operable to prioritize via implementation in forming integrated circuits by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the foundry production planning system 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a customer (e.g., a human or other user) 22 to interact with the computer system 102 and/or one or more communications devices to enable a system user (e.g., customer) 22 to communicate with the computer system 102 using any type of communications link. To this extent, the foundry production planning system 18 can manage a set of interfaces (e.g., graphical user interface(s), application program interface, etc.) that enable human and/or system users 22 to interact with the foundry production planning system 18. Further, the foundry production planning system 18 can manage (e.g., store, retrieve, create, manipulate, organize, present, etc.) data, such as order data (including wafer demand data, module demand data, yield data, etc.) using any solution.

In any event, the computer system 102 can comprise one or more general purpose computing articles of manufacture (e.g., computing devices) capable of executing program code, such as the foundry production planning system 18, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the foundry production planning system 18 can be embodied as any combination of system software and/or application software.

Further, the foundry production planning system 18 can be implemented using a set of modules 132. In this case, a module 132 can enable the computer system 102 to perform a set of tasks used by the foundry production planning system 18, and can be separately developed and/or implemented apart from other portions of the foundry production planning system 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of foundry production planning system 18 fixed thereon (e.g., one or more modules 132). However, it is understood that the computer system 102 and foundry production planning system 18 are only representative of various possible equivalent computer systems that may perform a process described herein. To this extent, in other embodiments, the functionality provided by the computer system 102 and foundry production planning system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as wafer demand data 142, module demand data 150 and/or yield data 155 using any solution. For example, the computer system 102 can generate and/or be used to retrieve wafer demand data 142, module demand data 150 and/or yield data 155 from one or more data stores, receive wafer demand data 142, module demand data 150 and/or yield data 155 from another system, send wafer demand data 142, module demand data 150 and/or yield data 155 to another system, etc. As noted herein, wafer demand data 142 can include customer order data regarding a demand for wafers, as well as a predicted and/or actual amount of inventory required to meet the wafer demand, module demand data 150 can include customer order data regarding a demand for modules, as well as a predicted and/or actual amount of inventory required to meet the module demand, and yield data 155 can include data such as predicted and/or actual yield data about one or more production processes in the formation of a semiconductor module.

While shown and described herein as a method and system for production planning in a foundry, it is understood that aspects of the invention further provide various alternative embodiments. For example, in one embodiment, the invention provides a computer program fixed in at least one computer-readable medium, which when executed, enables a computer system to plan production in the manufacture of integrated circuits (semiconductors). To this extent, the computer-readable medium includes program code, such as the foundry production planning system 18 (FIG. 12), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the foundry production planning system 18 (FIG. 12), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for foundry production planning in the formation of semiconductor devices. In this case, a computer system, such as the computer system 102 (FIG. 12), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

It is understood that in some embodiments, the planning techniques described herein can be applied to manufacturing processes and/or general business processes conventionally handled in a variety of industries. In this sense, the foundry production planning system 18 described herein can be interchanged for any manufacturing process prioritization system capable of prioritizing manufacturing processes (e.g., in making automobiles, computers, medical devices, etc.). That is, as described herein, the term "integrated circuit" or "semiconductor" can be replaced with the term "manufacturing" to describe one or more manufacturing process prioritization system(s).

It is further understood that while the principles of the invention are described herein with respect to production planning in the manufacture of semiconductor/integrated circuit devices, one or more of these principles may be applied to any industry where multi-part orders are filled. For example, the automobile, aerospace, and/or defense industries could benefit from the teachings disclosed according to various embodiments of the invention.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer-implemented method of modeling production for a semiconductor foundry, the method comprising:
    obtaining a multi-part order including:
        a first order for a fixed number of physical semiconductor wafers; and
        a second order for a fixed number of physical semiconductor modules formed from the fixed number of physical semiconductor wafers; and
    determining an amount of inventory required to fulfill the first order and the second order, wherein the determining includes:
        creating a first model including a first inventory amount required to meet the first order;
        creating a second model including a second inventory amount required to meet the second order;
        creating a supplemental component part number for the second inventory amount required to meet the second order;
        consigning the first inventory amount required to meet the first order back to the supplemental component part number, wherein a material balance constraint for the supplemental component part number is modeled according to the following:

$$I_{jma} = I_{(j-1)ma} + \sum_{k}\sum_{q} F_{jmakq} - \sum_{\substack{n\,st.m \\ is\,a\,component \\ of\,n}} \sum_{e} QTYPER_{jmaen} P_{jnae}$$

wherein: I: an inventory; P: a production amount; F: a shipment amount; j: a time period for shipment; m: a material type; a: plant location; n: a material being substituted; e: a process type; k: a demand center location; r: a new material; QTYPER: quantity of a part number and q: a demand class which indicates relative priority of operations; and
    running a single linear programming (LP) process using the first model and the second model to determine the amount of inventory required to fulfill the first order for the fixed number of physical semiconductor wafers.

2. The computer-implemented method of claim 1, further comprising providing a report indicating the inventory required to fulfill the first order and the second order.

3. The computer-implemented method of claim 1, wherein the multi-part order is placed by a single customer.

4. A system comprising:
    at least one computing device, including a processor, configured to model production for a semiconductor foundry by performing actions including:
        obtaining a multi-part order including:
            a first order for a fixed number of physical semiconductor wafers; and
            a second order for a fixed number of physical semiconductor modules formed from the fixed number of physical semiconductor wafers; and
        determining an amount of inventory required to fulfill the first order and the second order, wherein the determining includes:
            creating a first model including a first inventory amount required to meet the first order;
            creating a second model including a second inventory amount required to meet the second order;
            creating a supplemental component part number for the second inventory amount required to meet the second order;
            consigning the first inventory amount required to meet the first order back to the supplemental component part number, wherein a material balance constraint for the supplemental component part number is modeled according to the following:

$$I_{jma} = I_{(j-1)ma} + \sum_{k}\sum_{q} F_{jmakq} - \sum_{\substack{n\,st.m \\ is\,a\,component \\ of\,n}} \sum_{e} QTYPER_{jmaen} P_{jnae}$$

wherein: I: an inventory; P: a production amount; F: a shipment amount; j: a time period for shipment; m: a material type; a: plant location; n: a material being substituted; e: a process type; k: a demand center location; r: a new material; QTYPER: quantity of a part number and q: a demand class which indicates relative priority of operations; and
    running a single linear programming (LP) process using the first model and the second model to determine the amount of inventory required to fulfill the first order for the fixed number of physical semiconductor wafers.

5. The system of claim 4, wherein the at least one computing device is further configured to provide a report indicating the amount of inventory required to fulfill the first order and the second order.

6. The system of claim 4, wherein the multi-part order is placed by a single customer.

7. A computer program product comprising program code stored on a non-transitory computer readable medium, which when executed by at least one computing device, causes the at least one computing device to perform a method of modeling production for a semiconductor foundry, the method including:

obtaining a multi-part order including:
a first order for a fixed number of physical semiconductor wafers; and
a second order for a fixed number of physical semiconductor modules formed from the fixed number of physical semiconductor wafers; and
determining an amount of inventory required to fulfill the first order and the second order, wherein the determining includes:
creating a first model including a first inventory amount required to meet the first order;
creating a second model including a second inventory amount required to meet the second order;
creating a supplemental component part number for the second inventory amount required to meet the second order;
consigning the first inventory amount required to meet the first order back to the supplemental component part number, wherein a material balance constraint for the supplemental component part number is modeled according to the following:

$$I_{jma} = I_{(j-1)ma} + \sum_k \sum_q F_{jmakq} - \sum_{\substack{n\,st.m \\ is\,a\,component \\ of\,n}} \sum_e QTYPER_{jmaen} P_{jnae}$$

wherein: I: an inventory; P: a production amount; F: a shipment amount; j: a time period for shipment; m: a material type; a: plant location; n: a material being substituted; e: a process type; k: a demand center location; r: a new material; QTYPER: quantity of a part number and q: a demand class which indicates relative priority of operations; and
running a single linear programming (LP) process using the first model and the second model to determine the amount of inventory required to fulfill the first order for the fixed number of physical semiconductor wafers.

8. The computer program product of claim 7, which causes the at least one computing device to further provide a report indicating the amount of inventory required to fulfill the first order and the second order.

9. The computer program product of claim 7, wherein the multi-part order is placed by a single customer.

* * * * *